United States Patent Office 3,051,697
Patented Aug. 28, 1962

3,051,697
AZOMONAZONE N-OXIDES, PRODUCTION AND DEOXYGENATION
Charles E. Lewis, Somerville, Albert P. Paul, New Brunswick, Sien Moo Tsang, Middlesex, and Julian J. Leavitt, Plainfield, N.J., assignors to American Cyanamid Company, New York, N.Y., a corporation of Maine
No Drawing. Filed Oct. 6, 1958, Ser. No. 765,326
6 Claims. (Cl. 260—156)

This invention relates to three separate and distinct processes and also to certain new compounds related to these processes. More specifically, it relates to (1) a process for the preparation of quaternized heterocyclic azo dyes, (2) to a process for the deoxygenation of monazine oxides by the action of certain metals in an inert solvent, (3) to a process for the deoxygenation of monazine oxides with phosphorous trichloride in halogenated aromatic solvents and (4) to certain new azo derivatives of monazine oxides.

I. PROCESS FOR THE PREPARATION OF QUATERNIZED HETEROCYCLIC AZO DYES

This process of our invention relates to a new overall process for the preparation of quaternized heterocyclic azo dyes in which the heterocyclic group is a monazine of less than three rings, to which the azo group is attached in a position ortho to the monazine nitrogen. More specifically, it relates to a process in which a 2-amino monazine is converted to the 2-amino monazine oxide, which compound is then diazotized and coupled into a coupling component. The resulting 2-arylazo monazine oxide is then deoxygenated to give a 2-arylazo monazine which is then quaternized to the 2-arylazo monazinium dyestuff.

There has been recently developed a new class of dyestuffs for polyacrylic fibers which comprises azo derivatives of quaternized heterocyclic ring systems. Such dyestuffs can be illustrated with reference to the copending applications of Tsang, Lewis and Paul, Serial Nos. 643,231, filed March 1, 1957, now U.S. Patent No. 2,893,816, and Serial No. 719,744, filed March 7, 1958, now abandoned. Among the heterocyclic groups usable in these dyestuffs one of the most important of classes is the monazines of less than three rings, specifically, and most importantly, the pyridines and quinolines. From these classes one obtains some of the best of the new acrylic dyes. These latter dyes are usually azo derivatives in which the azo group is linked to a position ortho to the quaternized heterocyclic nitrogen. Such dyestuffs, however, present a very serious problem in preparation, since diazotized 2-aminopyridine and quinoline are not readily coupled, being very unstable. Consequently these azo compounds have not been prepared directly by the usual diazotization and coupling routes. Instead circuitous alternative routes have been used, such as the reaction of a 2-aminopyridine with an appropriate nitroso compound or the oxidation of an appropriately substituted N₁-pyridyl-N₂-aryl hydrazine. Both of these routes have the disadvantage of requiring intermediates which are difficult to obtain, since neither the nitroso compound nor the hydrazines are readily available with the substituents in the proper orientation. The best way to get any azo dye is by a process of diazotization and coupling and economically such a route is always to be preferred over alternative esoteric methods of forming the azo linkage.

We have found a synthetic route to the 2-arylazo monoazinium dyestuffs which uses the standard diazotization and coupling reaction. The process of our invention involves the four steps of preparing the N-oxide of the 2-amino monazine, the diazotizing and coupling of the 2-amino monazine N-oxide, the deoxygenating of the 2-arylazo monazine oxide and the quaternizing of the resulting 2-arylazo monazine. This process can be illustrated in more detail by the following equation using 2-amino pyridine as the monazine, dimethylaniline as the coupling component, iron as the reducing agent and dimethyl sulfate as the quaternizing agent:

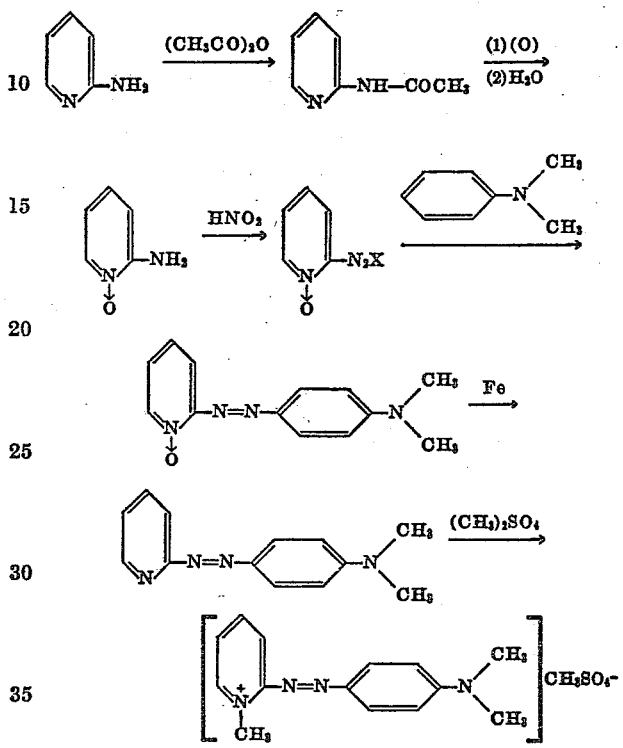

The starting materials for the process of our invention comprise the 2-amino monazines of less than 3 rings. Examples of such are 2-aminopyridine and its 3-, 4-, 5-, or 6-methyl derivatives as well as 2-amino-4,6-dimethylpyridine and other chloro, bromo, alkoxy and alkyl derivatives and 2-aminoquinoline and 1-aminoisoquinoline and their alkyl, alkoxy, and halogen derivatives. Other examples of the above compounds are: 2-amino-3-ethyl-6-methylpyridine; 2-amino-4-ethylpyridine; 2-amino-5-chloropyridine; 2-amino-3,5-dichloropyridine; 2-amino-5-ethoxypyridine; 2-amino-8-ethoxyquinoline; 2-amino-4-, 5-, 6-, 7- or 8-methylquinoline; 1-amino-isoquinoline and 1-amino-3-methylisoquinoline. These compounds are converted by any standard method known in the art to the corresponding N-oxides.

The diazotized 2-amino monazine N-oxides are capable, unlike the diazotized free 2-amino monazines, of being coupled. These N-oxides give very stable diazos which couple readily. In the second step of the process of our invention, they are coupled to any desired coupling component such as those described in the "Chemistry of Synthetic Dyes," by Venkataraman, Academic Press, New York, 1952, in the various chapters on azo dyes, such as chapters 3 to 6 inclusive and 8 to 22 inclusive. Especially to be desired are those having an electron releasing group substituted in a position conjugated with the position into which a diazo couples. Such electron releasing groups are discussed in detail in the discussion of the quaternized acrylic dyes in the copending application of Tsang, Lewis and Paul, Serial No. 643,231, filed March 1, 1957, now U.S. 2,893,816, in the discussion of the generic formula for such dyestuffs in that application. Examples of such coupling components are aniline; N,N-dimethylaniline; 3-methyl-N,N-dimethylaniline; 3-ethoxy-N,N-diethylaniline; 2,6-diethylaniline, N-methyl-N-β-cyanoethylaniline, N,N- bis(β-cyanoethyl)aniline; 3-methoxy-N-methyl-N-β-cyanoethylaniline; N,N-diethylaniline, α- or β-naphthylamine; N-methyldiphenylamine; N-methyl-α-naphthylamine; 2,5-dimethoxyaniline; N,N-bis(β-hydroxyethyl)aniline; 2,4-diaminotoluene, 2-methylimidazolylpyridine, 2-methylpyrrocoline; 2-phenylpyrrocoline; and 2,4-diamino-6-hydroxypyrimidine. It is especially important to use aromatic amines such as aniline omega salt; cresidine; 1-naphthylamine; 2-naphthylamine; 1,5-naphthylenediamine, and the like, since such coupling components produce an azo dye having a free amino group as the electron releasing group in a conjugated position.

The 2-arylazo monazine N-oxides produced above must then be deoxygenated to the corresponding 2-arylazo monazines. The deoxygenation of heterocyclic N-oxides is a well known reaction, but in the case of these compounds it must be performed in such a way as to attack the N-oxide group selectively, since the azo group is sensitive to most of the reaction conditions known to deoxygenate heterocyclic N-oxides. Any method of deoxygenating an N-oxide which will not break the N-N bond of the azo group may be used. Two such processes are described in this present specification as separate and distinct processes of our invention. Another less preferred method is the reduction by palladium in an alkaline medium, by which the monazine oxide is reduced to the monazine. At the same time the azo group becomes a hydrazo group which is readily aerated back to the azo group. Thus, although the azo group is partly attacked, the N-N bond is not broken.

The quaternization of the resulting 2-arylazo monazine N-oxide is carried out by well known procedures. The quaternizing group R may be any non-aromatic organic radical. For example, it may be an alkyl such as methyl, ethyl, propyl, butyl, lauryl, cetyl, octadecyl, and the like; or it may be an alkenyl group such as allyl or crotyl or an arylalkyl such as benzyl or substituted benzyl or a cycloalkyl group such as cyclohexyl. The quaternization process is carried out either by the reaction of the appropriate halide or the appropriate sulfate, for example, dimethyl sulfate, diethyl sulfate, butyl bromide, lauryl bromide, octadecyl bromide, benzyl chloride, allyl bromide, the corresponding tosylates and iodides and the like with the 2-arylazo monazine in a solvent inert to the reagents. For practical considerations, it is best to use a solvent which will not react with the quaternizing reagent and from which the quaternized dye will precipitate, such as alcohols, toluene, dichlorobenzene and the like. Water is less desirable as a solvent for this step because of its tendency to attack the quaternizing reagent.

It is an advantage of the process of our invention that it is much more flexible in the preparation of quaternized azo monoazinium dyestuffs for acrylic fibers. The intermediates are much more readily available. The process steps are simpler and the manipulations are easier to carry out. By the use of this process dyestuffs are prepared which cannot be prepared readily by the previously known circuitous routes.

The dyes obtained by this process of our invention are of great commercial importance for the dyeing of fibers of polyacrylonitrile, as is described in such applications as those of Tsang, Lewis and Paul mentioned above.

II. METALLIC DEOXYGENATION OF MONAZINE OXIDES

This process of our invention relates to the deoxygenation of monazine 1-oxide, and more specifically it relates to deoxygenation of monazine 1-oxides of the pyridine and quinoline series with metals above cadmium in the electromotive series and below calcium in the absence of acidic conditions.

The deoxygenation of monazine N-oxides by various methods has been described in the literature. The deoxygenation is in effect a reduction, and the monazine N-oxides are characterized by the fact that the N-oxide grouping is more resistant to reduction than are many substituents which can be placed upon the monazine rings. For example, the pyridine-N-oxides are more resistant to deoxygenation than is the nitro group to reduction. Thus 4-nitro-pyridine-1-oxide is reduced to 4,4'-azopyridine-N,N'-dioxide when milder reductions are attempted. When sufficiently strong reductions are used to deoxygenate the N-oxide, the nitro group simultaneously is reduced. Deoxygenation reagents which have been tried in the literature include such things as catalytic reductions, potassium nitrate and sulfuric acid, sulfuric acid and selenium dioxide, and metals with acid-reacting salts.

Since even the nitro group is attacked under conditions which deoxygenate pyridine-N-oxides, it could hardly be expected that still more sensitive groups such as the azo grouping could survive such a deoxygenation. There are also other groupings similarly sensitive to reduction which may be present in molecules containing monazine N-oxide configurations, such as carbonyl, azomethine, and styryl which would be attacked in the standard deoxygenation. There is consequently a great need for a method of deoxygenating monazine-N-oxides which are selective in their attack, leaving the other sensitive substituents in the molecule untouched. This is especially true when there are present groups such as azo groups, since this inability to deoxygenate the monazine N-oxide would put a serious barrier to such a synthetic approach to the quaternized monazinium azo dyes as is described in the first process of our invention.

We have found that the deoxygenation of monazine N-oxides can be cleanly carried out in excellent yield, by heating with a metal of specific electromotive activity, namely those below calcium and above cadmium, in the presence of a solvent which is inert under the conditions of the reaction to the metal and in the absence of acidic substances (that is, under approximately neutral conditions).

In the process of our invention the metals which may be used are those above cadmium and below calcium in the electromotive series. These metals are specifically, sodium, magnesium, beryllium, aluminum, manganese, zinc, chromium and iron. Metals above sodium in the electromotive series are too reactive and those below iron are not reactive enough to deoxygenate without attacking the more sensitive substituents elsewhere in the molecule such as an azo grouping. The metals are often used in finely divided form but can readily be used in grosser forms such as magnesium ribbon, mossy zinc etc. They can also be used in alloys with other metals. This can be with other metals in the operative group or with metals outside the group, such as amalgams with mercury. In some cases, as for example with sodium, the metal will melt under reaction conditions and the ebullition of the solvent will cause sufficient mixing to produce the desired extensive interphase contact between the dissolved reactant and the metal. The metal must be used in conjunction with a solvent since, in the absence of a solvent, decomposition of the product takes place and only low yields of deoxygenated monazine are obtained. With even a trace of acidic substances such as ferrous sulfate, acetic acid or the like, the more sensitive, easily reduced groupings, such as the azo grouping, are readily attacked. Consequently, it is important to use a good grade of metal free from acidic substances. One normally prefers to use a stoichiometric excess of the metal over the azomonazine oxide. From 1 to 6 moles excess of metal is preferable although amounts in excess of 6 moles are not deleterious. It is an advantage of this process that the excess metal will not adversely affect the process or lower the yield of the desired product.

A solvent is needed in the reaction of our invention, since in the absence of solvent decomposition of the product mostly takes place. The solvents usable are preferably water or water-miscible alcohols. Especially usable are methanol, ethanol, propanol, isopropanol, ethoxyethanol, butoxyethanol, ethoxyethoxyethanol, butoxyethoxyethanol and other alkanols. They may be used either anhydrous or diluted with water. The amount of water used may be up to 50% of the total solvent. Where an azeotrope is formed with water the amount of water is conveniently that present in normal azeotropic mixtures of the alcohol with water. Azeotropes containing less than 50% water can be obtained from the following alcohols and such azeotropes are suitable for the practice of our invention: n-propanol; isopropanol; n-butanol; isobutanol; secondary butanol; tert. butanol; n-amyl alcohol; primary isoamyl alcohol; tert. amyl alcohol; secondary pentanol-2; ethanol; allyl alcohol, and the like.

With certain of the above metals a special problem is encountered, since the metals react with the preferred alcoholic solvents. Such metals as sodium, magnesium, beryllium and aluminum react with these alcohols to generate hydrogen and thus produce reduction conditions which are too drastic for the azo groupings to survive. It is the metal and not its alcoholate which is the reactant in the process of our invention. With such metals it is desirable to use a different type of solvent or to control the reaction conditions so that the metal-solvent reaction is kept to a minimum. For example, magnesium reacts very little with alcohols unless a trace of iodine is added to initiate the reaction and the amount of water is kept to a minimum. Thus, this metal can be used in the presence of alcohol, so long as the iodine is excluded or extra water is used, i.e., the reaction conditions are controlled to keep the metal solvent reaction down. Solvents which are inert to such metals are the aromatic hydrocarbons such as benzene, toluene, xylene and the like, or higher boiling aliphatic hydrocarbons such as kerosenes etc. These solvents must of course be used dry, especially with such a metal as sodium, in order to avoid the reaction of these metals with water.

The basic requisite with the use of solvents is that an appreciable quantity of the monazine oxide must be in solution. This will of course vary with the monazine oxide used and with the solvent or solvent mixture used. As a rough rule of thumb, sufficient solvent to dissolve at least 10% of the monazine oxide should be used. In many cases this means that at least one part of solvent by weight per part of monazine oxide should be used. The usage of solvent is limited only by the ease of isolation of the product, since too much solvent will preclude complete precipitation of the product from the reaction mixture.

In the process of our invention the monazine N-oxide and the metal are placed in the solvent and the mixture is heated to a temperature of 65–125° C. until deoxygenation is substantially complete. The metal and metal oxide are then removed by filtration and washing with more solvent and the product is isolated by evaporation of the solvent.

The monazine N-oxides which may be used in this process of our invention include a wide range of monazine N-oxides. By monazine is meant a six-membered aromatic ring containing one nitrogen and five carbon atoms, the simplest monazine being pyridine. The term monazine is used as a generic term to include not only pyridine but its benzo derivatives and other homologs. The monazine N-oxides usable in the process of our invention are those of less than three rings, that is, the pyridines; quinolines; isoquinolines, and the like. Examples of simple monazine oxides which may be deoxygenated by our method are: 4-nitropyridine-1-oxide; 2-methyl-4-nitropyridine-1-oxide; 2,6 - dimethyl-4-nitropyridine-1-oxide; 3-nitro-4-hydroxypyridine-1-oxide; alpha picoline-1-oxide; 4-nitro-2,6-dimethylpyridine-1-oxide; 4-chloropyridine-1-oxide; 4-hydroxypyridine - 1 - oxide; 4-morpholinopyridine-1-oxide; 5-nitroquinoline-1-oxide; 4-quinoline-1-oxide; 4-hydroxyquinoline-1-oxide; 4-piperidinoquinoline-1-oxide; 8-nitroquinoline-1-oxide; 4-nitroquinoline-1-oxide; 4,8-dinitroquinoline-1-oxide; 5,8-dinitroquinoline-1-oxide, and the like. Even more importantly they include the various azo monazine oxides obtained by coupling 2-aminoazine oxides, such as 2-aminopyridine-N-oxide; 2-aminoquinoline-N-oxide and their methyl, halogen, alkoxy and other derivatives, into coupling components of all descriptions, such as those previously disclosed in connection with the over-all process of our invention.

It is an advantage of this process of our invention that its operable temperature range includes temperatures lower than those which can be used in the prior art processes. It is a further advantage of our invention that higher yields are obtained even where the prior art methods were operable. It is a still further advantage of our invention that the purity of the product is excellent, especially when reasonably pure monazine oxides are used as starting materials. This is especially important in the deoxygenation of azo products which can then be directly quaternized to give bright, clear dyestuffs for acrylic fibers, since the presence of impurities dulls a dyestuff. In the case of dyes containing a free amino group the latter must be acetylated, not because the amino group itself is affected, but because the free amino containing dyestuffs resist the mild deoxygenation process.

III. DEOXYGENATION WITH PCl₃

This process of our invention relates to a process of deoxygenating monazine N-oxides, and more specifically, it relates to a process of deoxygenating the N-oxides of monazines of less than three rings by mixing with $PCl_3$ in a chlorinated aromatic solvent.

The deoxygenation of monazine N-oxides with $PCl_3$ in some solvents has been known in the prior art. It is however impossible to use the process described there in order to effect a selective deoxygenation since other more sensitive groupings such as the nitro and the azo system are readily attacked. For example, 4-nitroquinoline-N-oxide is subject to replacement of the nitro by a chloro group and the replacement increases with increase in temperature. It is therefore surprising to find that by the use of a chlorinated aromatic solvent as described below, $PCl_3$ can be used to deoxygenate monazine N-oxides without attack on such sensitive groups as the nitro group.

Chloroform, a previously used solvent, is a disadvantageous solvent to use commercially because on storage it forms phosgene and is normally stabilized against such decomposition with ethanol. In order to run such a reaction the ethanol must be removed before mixture with the $PCl_3$, since ethanol reacts with $PCl_3$. Safe, commercial chloroform therefore cannot be used and pure chloroform presents a toxicity hazard. It is, therefore, important that the process of our invention not only overcomes prior problems but also eliminates this hazard.

We have found that monazine N-oxides can be deoxygenated by mixing at 0–50° C. with at least one mole of $PCl_3$ per mole of said monazine-N-oxide in the presence of a chlorinated benzene and heating the mixture below its reflux temperature until the starting material is consumed.

The solvents which may be used in the process of our invention include the various liquid chlorinated benzenes such as monochlorobenzene, the dichlorobenzenes and the trichlorobenzenes. The use of a solvent such as orthodichlorobenzene is especially advantageous, since these are the solvents which may also be used for quaternization in the process of preparing azo monoazinium dyestuffs for acrylic fibers as described in the first process of our invention. The quaternization step can be carried out on the deoxygenated azo monoazine oxide without isolating the intermediate tertiary base. The amount of chlorinated benzene used in our process is sufficient to give about 0.5 to 20% concentration by weight of the monazine N-oxide in the solvent.

In the process of our invention the reaction can be carried out at various temperatures. For example, with a disazo dye, deoxygenation occurs at 100° C. temperature with PCl₃ in orthodichlorobenzene. A monoazo monazine oxide is best deoxygenated at approximately 50° C., although lower temperatures and also higher temperatures can be used. About one mole of PCl₃ per mole of the oxide compound is used with slight excesses being allowable. Too much excess can cause side reactions and consequently not over three moles of excess PCl₃ per mole of N-oxide should be used.

IV. NEW N-OXIDES OF AZO SUBSTITUTED MONAZINES

This aspect of our invention relates to new azo substituted monazine-N-oxides, and more specifically, it relates to 2-arylazopyridine-N-oxides in which the aryl group carries a conjugated amino group and to 2-arylazopyridine-N-oxides in which the aryl group contains a further arylazo group.

Among the most important of the new azopyridinium dyestuffs for acrylics are those giving pure red and pure blue shades, which are derived from 2-arylazo pyridines having a primary amino group conjugated to the azo bridge. A simple example of such a compound is 2-(para-aminophenylazo)pyridine which, when quaternized, gives a brilliant red dye for acrylic fibers. Similarly, when this amino compound is diazotized and coupled into ordinary coupling components, the resultant disazo dyes, on quaternization, give important blue dyes for acrylic fibers. This aspect of our invention relates to the pyridine oxides which are precursors of these new acrylic dyestuffs. Such compounds can best be prepared commercially only by use of the methods of deoxygenating the pyridine oxide without touching the azo group, which are described in the preceding processes of our invention. These compounds of our invention form a part of the overall process of our invention previously described.

We have thus found certain new 2-arylazo pyridine oxides, in which the aryl group carries, in a position conjugated with the azo bridge, either a free amino group or an arylazo group, which are important intermediates in the preparation of outstanding dyestuffs for acrylic fibers. These arylazo pyridine oxides of our invention comprise such compounds as the 2-(ortho and para-aminophenylazo)pyridine oxides and the azo dyes derived therefrom by the diazotization and coupling of these amino compounds with such coupling components as aniline; N,N-dimethylaniline; 3 - methyl - N,N - dimethylaniline; 3-ethoxy-N,N-diethylaniline; 2,6-diethylaniline; 1,5-diaminonaphthalene; 2,6-diaminopyridine; N-methyl-N-β-cyanoethylaniline; N,N-bis(β-cyanoethyl)aniline; 3-methoxy-N-methyl-N-β-cyanoethylaniline; N,N-diethylaniline; α- or β-naphthylamine; N-methyldiphenylamine; N-methyl-α-naphthylamine; 2,5 - dimethoxyaniline; N,N - bis-(β-hydroxyethyl)aniline; 2,4-diaminotoluene; 2-methylimidazopyridine; 2-methylpyrrocoline; 2-phenylpyrrocoline; and 2,4-diamino-6-hydroxypyridine.

The various processes and compounds of our invention can be illustrated by the following examples in which parts are by weight unless otherwise specified and parts by volume are to parts by weight as milliliters are to grams.

Example 1

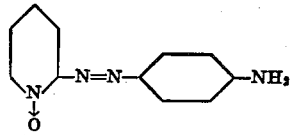

A solution of 41.0 parts of 2-aminopyridine-1-oxide, 54.1 parts of 20° Bé. hydrochloric acid and 100 parts of water is diazotized at 10° C. by the gradual addition of 64.3 parts of a 40% sodium nitrite solution. The diazo solution is stirred until diazotization is complete and then is added rapidly to a solution of 93.6 parts of aniline omega salt, 745 parts of water and 149 parts of anhydrous sodium acetate at 0–3° C. The slurry is treated with anhydrous sodium acetate to make a 30% solution and stirred until coupling is complete. The mixture is then filtered and washed with 124 parts of a 25% sodium acetate solution.

The above product is added to a solution of 174 parts of 24% aqueous ammonium hydroxide, 39.4 parts of 50% aqueous caustic soda and 2200 parts of water. After stirring overnight, the mixture is heated at 50° C. for one to five hours, 240 parts of sodium chloride is added and the 2-p-aminophenylazopyridine-1-oxide is isolated by filtration.

Example 2

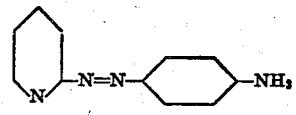

A solution of 10.0 parts of the product of Example 1, 104.9 parts of glacial acetic acid and 8.7 parts of acetic anhydride is stirred and heated at 75–80° C. for two hours. The cooled reaction mixture is poured into 600 parts of ice water and the mixture is then filtered, washed and dried. The yield is 10.9 parts of 2-p-acetaminophenylazopyridine-1-oxide.

A stirred mixture of 5.0 parts of the acetylated N-oxide, 5.0 parts of 60-mesh iron powder and 100 parts of 50% aqueous alcohol is refluxed until deoxygenation is substantially complete (16 hours when parts are grams). To the hot mixture is added 5.0 parts of a filter-aid and the mixture is filtered hot; the residue is washed thoroughly with hot alcohol. To the combined washings and filtrate is added 50 parts of 20% aqueous sodium hydroxide and the mixture is heated at reflux (for one hour when parts are grams). The alcohol is then removed by distillation. The residue is cooled and the mixture is filtered to give the desired product 2-(p-aminophenylazo)pyridine.

Example 3

Three parts of the product of Example 2 is suspended in 200 parts of ortho-dichlorobenzene and 2.1 parts of dimethyl sulfate are added. The mixture is stirred and heated at 75° for 16 hours, filtered, washed with monochlorobenzene and dried to give 5.0 parts of 1-methyl-2-p-aminophenylazopyridinium methyl sulfate. This quaternized azo dye when applied to acrylic fibers gives red shades of good fastness to light.

Example 4

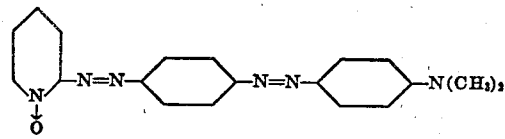

A solution of 19.6 parts of the product of Example 1, 208 parts of 20° Bé. hydrochloric acid and 183 parts of water is diazotized at 0–5° C. by gradual addition of 15.6 parts of a 40% sodium nitrite solution. The solution is stirred at 0–5° C. until diazotization is complete and is then added rapidly to a solution of 10.9 parts of dimethylaniline, 84.6 parts of glacial acetic acid, 73 parts of anhydrous sodium acetate and 403 parts of water. The mixture is stirred for a short period at 0–5° C., and then heated to 80° C. until coupling is complete. It is then cooled to room temperature slowly with stirring. Filtration, water washing, and drying at 65° C. gives 2-(p-dimethylaminophenylazophenyl)pyridine-1-oxide.

If, in place of dimethylaniline, an equivalent amount of 1-naphthylamine is used, the corresponding product, 2-(4-amino-1-naphthylazo)pyridine 1-oxide, is obtained.

Example 5

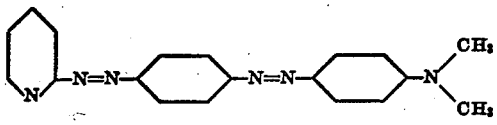

A stirred mixture of 2.50 parts of the product of Example 4, 2.50 parts (60-mesh) magnesium powder and 100 parts of absolute ethyl alcohol is refluxed with vigorous stirring for 16 hours until deoxygenation is complete. To the hot mixture is added 2.50 parts of a filter-aid and the mixture is filtered hot through a pad of filter-aid; the residue is washed thoroughly with hot absolute ethyl alcohol. The combined washings and filtrate are reduced in volume until crystals appear, then cooled and filtered to give black crystals of the disazo dye, which can be quaternized by the procedure of Example 3 to give a good blue dye for acrylic fibers.

Example 6

A mixture of 2.47 parts of the acetylated product of Example 1, 2.47 parts of magnesium turnings, 50 parts by volume of 3A ethyl alcohol and 100 parts of water are stirred at reflux until deoxygenation is complete, as determined by spectral analysis of a sample. The mixture is then filtered while hot. To the filtrate is added 25 parts by volume of 20% sodium hydroxide solution and the mixture is heated under reflux until hydrolysis is complete. The ethanol is then removed by evaporation and the residue is cooled and filtered to give the product 2-(p-aminophenylazo)pyridine.

In the above procedure, if 100% dry ethanol is used instead of ethyl alcohol and water, the same product is obtained.

If toluene is used as a solvent in place of the alcohol-water the same product is obtained.

Example 7

A stirred mixture of 2.50 parts of the product of Example 1, acetylated as in Example 2, 2.50 parts of zinc powder and 100 parts of 50% aqueous alcohol is refluxed with vigorous stirring for 16 hours. To the hot mixture is added 2.50 parts of filter-aid and the mixture is filtered hot through a pad of filter-aid; the residue is washed thoroughly with hot alcohol. To the combined washings and filtrate is added 25 parts of 20% aqueous sodium hydroxide and the mixture is refluxed for one hour. The alcohol is removed by distillation at atmospheric pressure, and after cooling, the mixture is filtered to give orange crystals of the 2-(p-aminophenylazo)pyridine.

If, in place of the product of Example 1, the azo combination 2-(4-methylaminophenylazo)pyridine 1-oxide is used, the deoxyenated free azo base is obtained.

If tin powder or copper powder is used in place of zinc in this reaction, no deoxygenation takes place. The starting material is recovered.

Example 8

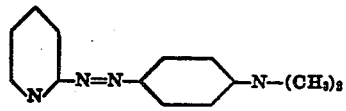

2.50 parts 2-(4 - dimethylaminophenylazo)pyridine- 1 - oxide and 0.24 part of sodium are refluxed in 100 parts dry benzene until deoxygentation is complete. A filter-aid is added and the mixture is filtered. The residue is discarded. The filtrate is concentrated until precipitation starts. It is then cooled and the black crystalline product filtered off and dried.

If, in place of benzene, toluene is used, the same product is formed.

Example 9

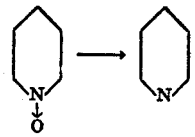

A mixture of 22.0 parts of pyridine 1-oxide, 22.0 parts of 60 mesh iron powder, 450 parts by volume of 3A ethyl alcohol and 450 parts of water are stirred at reflux until deoxygenation is complete. The ethyl alcohol is then distilled off and the residue steam distilled until 1500 parts by volume containing the pyridine is collected. The distillate is saturated with sodium chloride and extracted several times with ether. The ether extract is then dried and the ether removed by distillation. Pyridine is then obtained from the residue in excellent yield by distillation at 114–115° C.

If, in place of 22.0 parts of pyridine-1-oxide, 33.6 parts of quinoline-1-oxide are used in the process of this example, quinoline is obtained in good yield.

Example 10

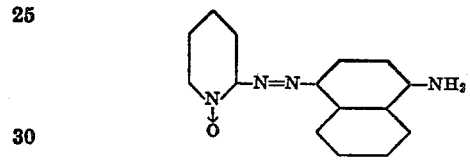

5.0 parts 2-aminopyridine-1-oxide are dissolved in 80 parts of an aqueous solution containing 7.4 parts real hydrochloric acid and cooled to 0° C. 7.0 parts 40% sodium nitrite solution are added over two hours and the mixture is stirred one additional hour. The diazonium solution is added to 7.02 parts alpha-naphthylamine slurried in 100 parts 10% sodium carbonate. The mixture is stirred for four hours and the product is filtered and recrystallized from toluene. The product is subjected to the procedure of Examples 2 and 3 to give 1-methyl-2-(4-amino-1-naphthylazo)pyridinium methosulfate, a good blue dye on acrylic fibers.

Using this procedure other azo combinations may be made such as those in the following table. They too, by the procedures of Examples 2 and 3 (where there is a free amino group) or by the procedures of Examples 5 and 3 (when there is no free amino group) give good dyes for acrylic fibers.

| Diazotized 2-aminopyridine 1-oxide coupled with aromatic amines and naphthols | Deoxygenated product obtained |
|---|---|
| Monomethylaniline | 2-(p-methylamino-phenylazo)pyridine. |
| 3-methylamino-anisole | 2-(4-methylamino-2-methoxy-phenylazo)pyridine. |
| Cresidine | 2-(4-amino-2-methoxy-5-methyl-phenylazo)pyridine. |
| Tetrahydroquinoline | 2-(1,2,3,4-tetrahydro-6-quinolylazo)pyridine. |
| 2-naphthol | 2-(2-hydroxy-1-naphthylazo)pyridine. |
| 2-naphthol-6-sulfonamide | 2-(2-hydroxy-6-sulfamoyl-1-naphthylazo)pyridine. |
| 2-methylpyrimidazole | 2-(2-methyl-3-pyrimidazolylazo)pyridine. |
| Dimethylaniline | 2-(4-dimethylaminophenylazo)pyridine. |

In place of 2-aminopyridine-1-oxide, 2-aminoquinoline-1-oxide may be used and the azo dyes deoxygenated to form the corresponding products, which can be quaternized to give dyes for acrylic fibers.

Example 11

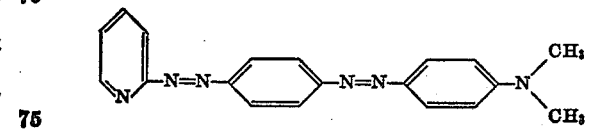

1.42 parts of the product of Example 4 is dissolved in 50 parts by volume of orthodichlorobenzene at the boil and the mixture is cooled. 0.72 part of phosphorus trichloride is added rapidly with stirring. The reaction mixture is stirred until deoxygentation is complete. The mixture is then drowned in 100 parts of water and the pH adjusted to 8 with about 50 parts by volume of 5 N sodium hydroxide solution. After further stirring, the water mixture is separated and washed several times with 50 parts by volume of orthodichlorobenzene. The extracts are dried over anhydrous sodium sulfate. They contain the deoxygenated material as can be shown by spectroscopic analysis.

*Example 12*

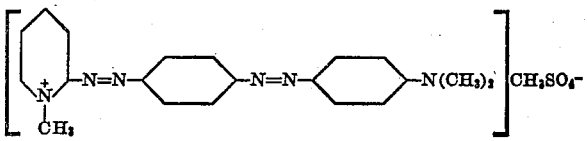

A mixture of 11.0 parts of the disazo product of Example 4 and 480 parts of dry orthodichlorobenzene is heated to 100° C. and at this temperature is added a solution of 4.4 parts of phosphorous trichloride dissolved in 14.4 parts of dry orthodichlorobenzene. The reaction mixture is heated at 100° C. for a short time and then cooled rapidly to 20° C. To the cooled mixture is added 15.3 parts of a 50% sodium hydroxide solution and 185 parts of water, and after stirring for several minutes, 15 parts of a filter-aid is added. The mixture is stirred for a short time, and then filtered. The organic layer, after separation, is washed with 200 parts of water, and then dried over anhydrous sodium sulfate. The mixture is filtered and 3.53 parts of dimethyl sulfate is added. The mixture is heated at 75° C. until quaterniaztion is complete, after which it is cooled and filtered. The residue is washed with monochlorobenzene and dried at 75° C., to give 2-(p-[p-dimethylaminophenylazo]-phenylazo)-1-methylpyridinium methyl sulfate.

*Example 13*

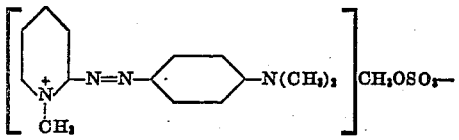

A solution of 66 parts of water, 31.4 parts of 20° Bé. hydrochloric acid and 8.53 parts of real 2-aminopyridine-N-oxide is diazotized at 10–12° C. by the gradual addition of 13.4 parts of a 40% sodium nitrite solution. The solution is stirred until diazotization is complete. A solution of 10.1 parts of dimethylaniline dissolved in 10.6 parts of glacial acetic acid is then added gradually. The reaction mixture is raised to a pH of 6 by careful addition of a 24% sodium hydroxide solution. The product is filtered, washed with water and dried at 60–65° C. to give 2-p-dimethylaminophenylazopyridine-1-oxide.

12.1 parts of the above product is dissolved in 522 parts of orthodichlorobenzene at 75° C. The solution is cooled to 30° C. and 8.6 parts of phosphorous trichloride is added gradually, while maintaining the reaction mixture at or below 50° C. during the addition. The mixture is stirred at room temperature for two hours and finally at 50° C. for one hour. After cooling to room temperature the reaction mixture is added cautiously to a solution of 195 parts of water and 15 parts of sodium hydroxide, using ice, as necessary, to keep the temperature below 50° C. The mixture is agitated thoroughly and the layers are then separated. The aqueous alkaline layer is extracted twice with 65-part portions of orthodichlorobenzene. The combined orthodichlorobenzene extracts are extracted with 50-part portions of water until the aqueous extract is free of caustic.

The combined orthodichlorobenzene extracts are dried over anhydrous sodium sulfate. To the dried solution is added 7.7 parts of dimethyl sulfate. The reaction mixture is stirred at room temperature until reaction is complete. It is then filtered and the product is washed with monochlorobenzene and dried at 75° C. The 2-p-dimethylaminophenylazo-1- methylpyridinium methylsulfate so obtained dyes acrylic fibers a reddish shade of violet.

*Example 14*

To a mixture of 4.85 parts of 2-(p-dimethylaminophenylazo)-pyridine 1-oxide and 88 parts of chlorobenzene, held at 50° C., is added 5.5 parts of phosphorus trichloride. The resulting mixture is heated to 80° C. and then cooled to room temperature. The product is purified by dissolving in dilute hydrochloric acid and reprecipitating with sodium hydroxide solution.

*Example 15*

A solution of 2.6 parts of 2-(4-acetaminophenylazo) pyridine-1-oxide in 225 parts of chloroform is distilled until half the solvent is removed and discarded. The residual solution is cooled to 25° C. and 1.4 parts phosphorous trichloride is added dropwise with stirring. It is heated one half hour at 50–55° C. then drowned in water and made alkaline with sodium hydroxide solution. The chloroform is removed by steam stripping. Sufficient ethanol is added to dissolve the product and the solution is then refluxed for three hours. The alcohol is then stripped off and 2-(4-aminophenylazo)pyridine is isolated.

*Example 16*

A stirred mixture of 2.50 parts of 4-nitropyridine-N-oxide, 2.50 parts of 60-mesh iron powder and 100 parts of 50% aqueous alcohol is refluxed with vigorous stirring until deoxygenation is complete (16 hours when parts are grams). To the hot mixture is added 2.50 parts of filter-aid and the mixture is filtered hot through a pad of filter-aid. The residue is then washed thoroughly with hot alcohol. The combined filtrate and washings are reduced in volume until crystals appear. The mixture is then cooled and filtered to give 4-nitropyridine.

We claim:

1. A process of deoxygenating a 2-arylazomonazine-N-oxide selected from the group consisting of said N-oxides of the formulae

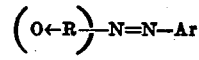

and

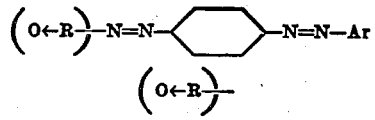

in which (O←R) represents a 2-monazine-N-oxide wherein R is selected from the group consisting of the pyridyl, quinolyl, isoquinolyl and methyl, ethyl, methoxy, ethoxy, chloro- and bromo-substituted pyridyl, quinolyl and isoquinolyl radicals, and Ar is the residue of an aromatic carbocyclic coupling component the ring structure of which is selected from those of the group consisting of phenyl and naphthyl, said coupling component being further limited to those having an amino group in a position conjugated with the azo linkage and the said conjugated amino group being selected from the group consisting of amino, mono- and di-(lower alkyl)amino, phenylamino, phenylmethylamino, methyl-cyanoethylamino, bis-(cyanoethyl)amino and hydroxyethylamino, which comprises heating said N-oxide to 65 to 125° C. with at least one mole per mole of said N-oxide of a metal below calcium and above cadmium in the electromotive series, in the presence of a solvent for said N-oxide, said solvent being inert to said metal, present in an amount at least sufficient to dissolve at least 10% of said N-oxide, and being selected from the group consisting of benzene, toluene, xylene, kerosene, mono-, di- and trichlorinated benzenes, alcohols of 1–8 carbon atoms containing less than 50% water and azeotropic mixtures of water and alcohols of from two to five carbons.

2. The process of claim 1 in which the N-oxide is 2-(p-aminophenylazo)pyridine-N-oxide.

3. The process of claim 1 in which the N-oxide is 2-(p-dimethylaminophenylazo)pyridine-N-oxide.

4. A 2-arylazomonazine-N-oxide selected from the group consisting of said N-oxides of the formulae

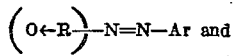 and

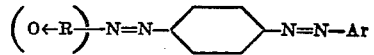

in which (O←R) represents a 2-monazine-N-oxide wherein R is selected from the group consisting of the pyridyl, quinolyl, isoquinolyl, and methyl, ethyl, methoxy, ethoxy, chloro- and bromo-substituted pyridyl, quinolyl and isoquinolyl radicals, and Ar is the residue of an aromatic carbocyclic coupling component the ring structure of which is selected from those of the group consisting of phenyl and naphthyl, said coupling component being further limited to those having an amino group in a position conjugated with the azo linkage and the said conjugated amino group being selected from the group consisting of amino, mono- and di-(lower alkyl)amino, phenylamino, phenylmethylamino, methyl-cyanoethylamino, bis-(cyanoethyl)amino, and hydroxyethylamino.

5. 2-(p-aminophenylazo)pyridine-N-oxide.

6. 2-[4 - (p - dimethylaminophenylazo)phenylazo]-pyridine-N-oxide.

References Cited in the file of this patent
UNITED STATES PATENTS 2,864,813    Bossard et al. _____ Dec. 16, 1958

OTHER REFERENCES

Colonna et al.: Gazz. Chim. Ital., vol. 85, Fasc XI, pp. 1508–18.

Hertog et al.: "Recueil des Travaux Chimiques," 70, 1951, p. 583.

Hamana: "Chemical Abstracts," 46, 4542c (1952).

(Copies in Pat. Office Sci. Lib.)

UNITED STATES PATENT OFFICE
CERTIFICATE OF CORRECTION

Patent No. 3,051,697                       August 28, 1962

Charles E. Lewis et al.

It is hereby certified that error appears in the above numbered patent requiring correction and that the said Letters Patent should read as corrected below.

Column 12, lines 57 to 59, strike out the formula $$(O \leftarrow R \rightarrow$$

Signed and sealed this 5th day of February 1963.

(SEAL)
Attest:

ERNEST W. SWIDER
Attesting Officer

DAVID L. LADD
Commissioner of Patents